United States Patent

[11] 3,621,263

| [72] | Inventors | Warren E. Gilson<br>4801 Sheboyan Ave.;<br>Robert E. Gilson, 4 Franklin Ave., both of<br>Madison, Wis. 53705 |
|---|---|---|
| [21] | Appl. No. | 27,847 |
| [22] | Filed | Apr. 13, 1970 |
| [45] | Patented | Nov. 16, 1971 |

[54] VOLUMETRIC FRACTION SUPPLY APPARATUS
7 Claims, 3 Drawing Figs.

[52] U.S. Cl. .................................. 250/218,
137/487.5, 356/180
[51] Int. Cl. ........................................ G01n 21/26
[50] Field of Search............................. 250/218;
137/487.5; 356/179, 208, 180, 181, 246

[56] References Cited
UNITED STATES PATENTS
2,764,178  9/1956  Paul et al. .................... 350/218 X 3,060,318  10/1962  Ouvrard ...................... 356/208 X
3,242,720  3/1966  Zavasnik ...................... 137/487.5 X
3,523,733  8/1970  Kling et al. ................... 250/218 X

*Primary Examiner*—Walter Stolwein
*Attorney*—Mason, Kolehmainen, Rathburn & Wyss ABSTRACT: A volumetric unit for supplying fractions of predetermined volume from a source of liquid to a fraction collector receptacle includes a container into which liquid is supplied through a supply conduit and a liquid supply valve. During the supply of liquid, a liquid delivery conduit extending from the container is blocked, and displaced air is vented from the container by a vent conduit including an air vent valve. When a predetermined volume of liquid has been admitted to the container, a liquid level sensing system operates a control to simultaneously close the liquid supply valve and to close the air vent valve. The container is pressurized to force the accumulated liquid fraction through the liquid supply conduit to the fraction collector receptacle.

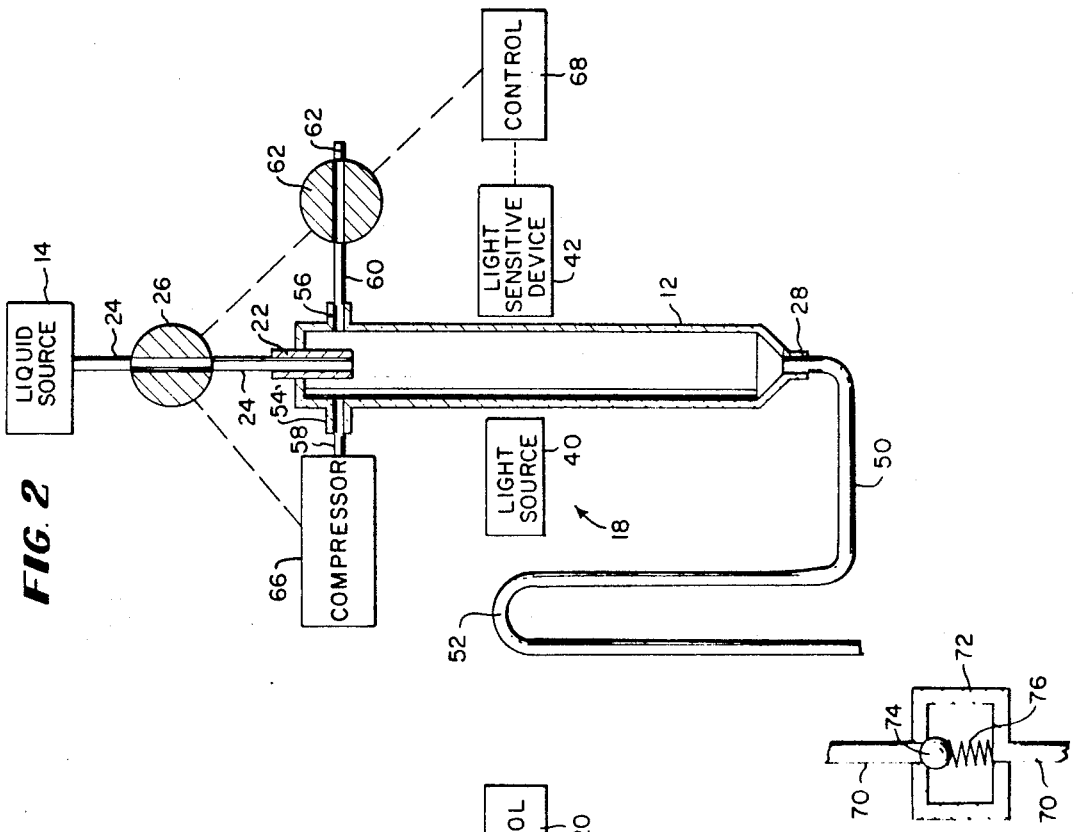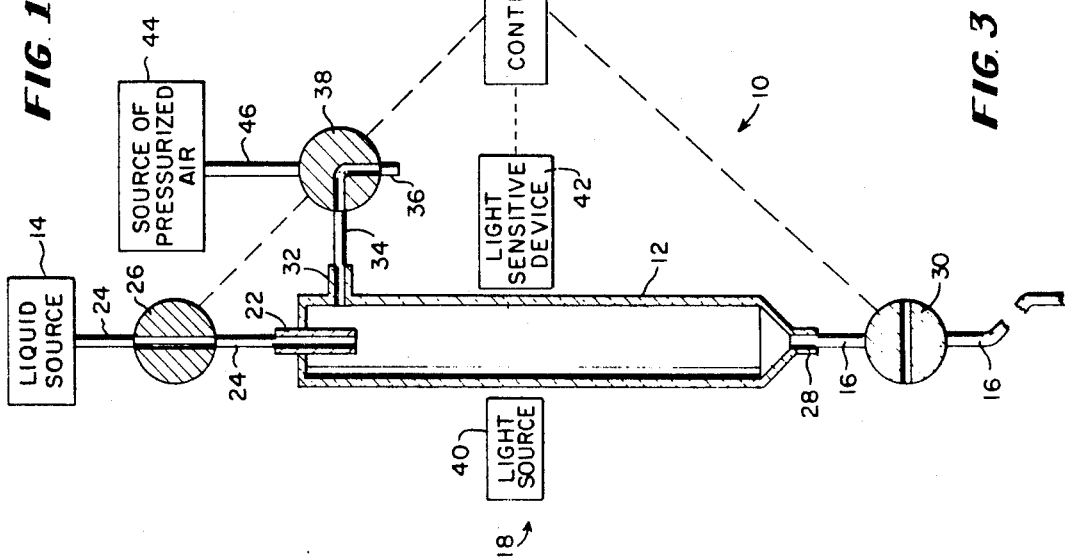
INVENTORS.
WARREN E. GILSON
ROBERT E. GILSON

VOLUMETRIC FRACTION SUPPLY APPARATUS

The present invention relates to improvements in apparatus for supplying fractions of predetermined volume to successive containers of a fraction collector or the like from a liquid source such as a chromatographic column or the like.

Known volumetric units for use with fraction collectors have not been entirely satisfactory because in some cases they are not reliable in supplying fractions of a uniform, predetermined desired volume, and because in some cases they cannot be used with a flexible liquid delivery tube.

One type of known unit utilizes gravity feed for discharging a measured quantity of fluid into a fraction collector receptacle. This type of device is subject to the disadvantage that it cannot be used successfully with a long, flexible delivery conduit, and thus must be mounted, for example on the fraction collector carriage, for movement with respect to the fraction collector receptacles.

Another type of volumetric unit uses a siphon effect to measure and deliver quantities of liquid to containers. Units of this type have been highly unreliable since they are greatly dependent upon variables such as the characteristics of the liquid and the size of the delivery tube.

Important objects of the present invention are to provide an improved volumetric unit for delivering fractions to fraction collector receptacles; to provide a unit that can be used with elongated and/or flexible delivery tubes of various sizes; and to provide a unit that is simple, highly reliable and accurate in operation.

In brief, in accordance with the features of the present invention there is provided an improved apparatus for supplying a fraction of predetermined volume from a source of liquid to a fraction collector receptacle. The apparatus includes a container and a first conduit including a first valve extending between the container and the surrounding atmosphere for selectively venting the container. A second conduit is connected between the liquid source and the container and serves to admit liquid to the container. A liquid level sensing means is provided for determining when the level of liquid in the container reaches the desired predetermined level. The container includes an outlet connected to a liquid delivery conduit for supplying liquid from the container to the fraction collector receptacle. In accordance with an important feature of the invention, there is provided a control means for closing the air vent valve and for pressurizing the container in response to operation of the liquid level sensing device thereby to positively and reliably discharge the liquid fraction through the liquid delivery conduit.

The invention together with the above and other objects and advantages may be best understood from considering the embodiments illustrated in the accompanying drawing, wherein:

FIG. 1 is a partly sectional and diagrammatic illustration of volumetric fraction supply apparatus constructed in accordance with the present invention;

FIG. 2 is a view similar to FIG. 1 illustrating an alternative embodiment of the invention; and FIG. 3 is a fragmentary sectional and diagrammatic view illustrating an alternative form of the liquid delivery conduit.

Having reference now to the drawing and initially to FIG. 1, there is illustrated a volumetric fraction supply apparatus designated as a whole by the reference numeral 10 and constructed in accordance with the principles of the present invention. In general, the apparatus 10 includes a container 12 into which there is admitted a desired liquid material supplied from a suitable liquid source 14 which may, for example, comprise a chromatographic column or other suitable source. When a desired predetermined quantity of liquid has been collected in the container 12, the liquid is supplied through a delivery conduit 16 to a fraction collector vial or container (not shown).

In accordance with an important feature of the present invention, the evacuation of the liquid fraction from the container 12 through the delivery conduit 16 is accomplished by pressurizing the container 12 under the control of a liquid level sensing device generally designated as 18 and a control generally designated as 20, the operation of which are described in greater detail below.

An inlet 22 of the container 12 is connected by way of a liquid supply conduit 24 with the liquid source 14. A liquid supply valve 26 is maintained in the illustrated open condition to permit the admission of liquid to the container 12.

An outlet 28 of the container 12 is connected to the liquid delivery conduit 16. A liquid delivery valve 30 is maintained in its illustrated closed condition while liquid is collecting in the container 12 and is moved to its open position to permit the flow of liquid to the fraction collector receptacle. As liquid is admitted to the container 12 through the inlet 22, the level of liquid rises within the container. Air displaced from the interior of the container is vented to atmosphere by way of an air connection 32, an air conduit 34 and a vent 36. A valve 38 connected to the air conduit 34 is maintained in its illustrated position intercommunicating the conduit 34 and the vent 36 while liquid is added to the container 12.

In order to control the level of liquid collected within the container 12, there is provided the liquid level sensing device 18. The device 18 includes a light source 40 located on one side of the container 12 and a light sensitive device 42 located on the opposite side of the container 12, the container 12 being at least partly transparent and preferably constructed of glass or transparent plastic. The source 40 and device 42 are arranged to provide a suitable output signal when the liquid level within the container 12 reaches a desired predetermined level. For example, the light source 40 and the light-sensitive device 42 may be of the type described in pending patent application, Ser. No. 702,273 filed Feb. 1, 1968 by Warren E. Gilson.

In accordance with an important feature of the present invention, when the desired level of liquid has been collected in the container 12, the control 20 functions to discontinue the supply of liquid to the container 12, to block the air vent 36 from the container 12, to open the liquid delivery conduit 16 and to pressurize the interior of the container 12 in order to evacuate the collected fraction fully from the container 12 through the conduit 16 to the fraction collector receptacle.

More specifically, when the liquid within the container 12 reaches the desired level, the liquid level sensing device 18 provides a control signal or the like for operation of the control 20 as illustrated by a broken line in FIG. 1. Control 20 may be of any suitable type such as an electrical control circuit or the like. On receipt of a control signal or the like from the liquid level sensing device 18 the control 20 serves to operate valves 26, 30 and 38, for example by rotation of each of the valves through 90° in a clockwise direction. Operation of the valve 26 blocks the liquid supply conduit 24 and prevents the admission of further liquid from the source 14 into the container 12. Operation of the valve 30 opens the liquid delivery conduit 16 and permits the flow of liquid from the container 12 to the fraction collector receptacle. Movement of the valve 38 serves to block the communication between the vent 36 and the air conduit 34. Furthermore, operation of the valve 38 fully to its alternate position serves to intercommunicate the conduit 34 with a suitable source 44 of pressurized air and a pressurized air conduit 46. Advantageously, pressurized air from the source 44 is not communicated to the interior of the container 12 until after the valve 26 has been fully closed, the valve 30 has been fully opened, and the air vent 36 has been fully blocked.

When pressurized air is admitted to the container 12 from the source 44 through the conduits 46 and 34, the pressurized air is effective to positively evacuate the liquid fraction of predetermined volume from the container. The fraction is forced through the outlet 28 and through the liquid delivery conduit 16. Since gravity or a siphon effect are not relied upon for moving the liquid sample, the tube 16 may be of any desired size and length, and furthermore, may be a flexible tube. Consequently, it is possible to mount the apparatus 10 in a fixed position and to move the tube 16 sequentially into alignment with containers of a fraction collector.

With reference now to FIG. 2 there is illustrated an alternative embodiment of the invention generally designated by the reference numeral 48 and constructed in accordance with the principles of the invention. In many respects the device 48 is identical to the device 10, and the identical structure is identified by corresponding reference numerals and is not again described in detail.

The volumetric fraction supply apparatus 48 illustrated in FIG. 2 includes an alternative structure for maintaining a liquid supply conduit 50 blocked during the process of admitting liquid to the container 12. More specifically, a liquid delivery conduit 50 includes a segment 52 located at a higher vertical level than the liquid level sensing device 18 and thus at a higher vertical level than the level of liquid to be admitted to the container 12. As a result, liquid cannot flow through the conduit 50 during the filling operation. However, when the container 12 is pressurized, the pressure is sufficient to force the liquid fraction through the segment 52 and to the fraction collector receptacle. The use of the segment 52 makes it possible to dispense with the valve 30 of FIG. 1 for controlling the discharge of liquid from the container 12.

The device 46 also differs from the device 10 in the arrangement for venting and for pressurizing the container 12. More specifically, the container 12 includes a pair of air connections 54 and 56 connected respectively to a pressurized air conduit 58 and a vent conduit 60. A vent valve 62 is connected between the conduit 60 and an air vent 64 communicating freely with atmosphere, and the valve 62 is maintained in the illustrated open position during the filling of container 12. The pressurized air conduit 58 is coupled to a compressor 66 which is not operating during filling of the container 12.

When the level of liquid within the container 12 reaches the desired magnitude, the liquid level sensing device 18 provides an output signal as indicated by a broken line to a control 68. The control 68 includes suitable structure for operating the valves 26 and 62 to their alternative position thereby to close the interconnection between the container 12 and the liquid source 14 and to close the interconnection between the container 12 and the vent 64. As indicated by an additional broken line in FIG. 2, the compressor 66 is preferably energized upon complete closing of the valves 26 and 62 thereby to pressurize the interior of the container 12 and force the liquid fraction through the delivery tube 50.

Having reference now to FIG. 3 there is illustrated an alternative structure for maintaining the liquid delivery conduit in a blocked condition until it is desired to release liquid from the container 12. In FIG. 3 there is illustrated a liquid delivery conduit 70 including a pressure-operated valve 72 having a valve body 74 maintained normally in a closed position by means of a spring 76. When the container 12 is pressurized, the pressure is transmitted through the conduit 70 against the valve member 74, and the force of the spring 76 is overcome and the valve is opened, permitting the discharge of liquid through the conduit 70.

Although the invention has been described in connection with the illustrated embodiments thereof, it should be understood that details of the illustrated embodiments do not limit the invention as defined in the following claims.

What is claimed and desired to be secured by Letters Patent of the United States is:

1. Apparatus for supplying a fraction of predetermined volume from a source of liquid to a fraction collector receptacle, said apparatus comprising in combination:

a container having a single continuous cavity of fixed volume;

first conduit means including a first valve extending between said cavity and atmosphere for venting said cavity;

second conduit means including a second valve connected between the liquid source and the cavity for admitting liquid to the cavity;

liquid level sensing means responsive to the liquid in said cavity reaching a predetermined level;

said cavity having an outlet and having a liquid delivery conduit extending from said outlet to the fraction collector receptacle;

a source of pressure;

control means operatively associated with said liquid level sensing means for simultaneously closing said first and second valves and for intercommunicating said source and said cavity in response to operation of said liquid level sensing means for discharging a fraction of predetermined volume through said liquid delivery conduit; and means blocking said liquid delivery conduit during the admission of liquid to said container.

2. Apparatus as claimed in claim 1, said blocking means comprising a portion of said liquid delivery conduit extending higher than the level of said liquid level sensing means.

3. Apparatus as claimed in claim 1, said blocking means comprising an additional valve means, said control means including means for opening said additional valve means in response to operation of said liquid level sensing means.

4. Apparatus as claimed in claim 1, said blocking means comprising a pressure-responsive valve movable to an open condition upon the pressurization of said container.

5. Apparatus as claimed in claim 1, said liquid delivery conduit comprising a flexible tube.

6. Apparatus as claimed in claim 1, said control means including an additional valve means for interconnecting said source of pressure and said container upon operation of said liquid level sensing means.

7. The apparatus of claim 1, said liquid level sensing means including a light source and a light-responsive device disposed on opposite sides of said container, said container being at least partly transparent.

* * * * *